United States Patent
Ebbesen et al.

(10) Patent No.: US 10,788,015 B2
(45) Date of Patent: Sep. 29, 2020

(54) METHOD OF HANDLING A WIND TURBINE ROTOR BLADE PITCH BEARING UNIT

(71) Applicant: Siemens Gamesa Renewable Energy A/S, Brande (DK)

(72) Inventors: Henning Ebbesen, Skjern (DK); Christian Laursen, Hedensted (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 572 days.

(21) Appl. No.: 15/619,685

(22) Filed: Jun. 12, 2017

(65) Prior Publication Data
US 2018/0003157 A1 Jan. 4, 2018

(30) Foreign Application Priority Data
Jun. 30, 2016 (EP) ..................... 16177271

(51) Int. Cl.
*F03D 13/10* (2016.01)
*F03D 80/70* (2016.01)
(Continued)

(52) U.S. Cl.
CPC ........... *F03D 13/10* (2016.05); *F03D 1/0658* (2013.01); *F03D 7/0224* (2013.01); *F03D 80/50* (2016.05); *F03D 80/70* (2016.05); *F03D 1/065* (2013.01); *F05B 2230/60* (2013.01); *F05B 2230/61* (2013.01); *F05B 2230/70* (2013.01);
(Continued)

(58) Field of Classification Search
CPC .......... F03D 13/10; F03D 80/50; F03D 80/70; F03D 1/0658; Y02E 10/721; F05B 2230/61; F05B 2230/60; F05B 2230/70; F05B 2230/80; Y02P 70/523
See application file for complete search history.

(56) References Cited

U.S. PATENT DOCUMENTS

2010/0135797 A1* 6/2010 Nies ........................ F03D 80/50
416/9
2011/0200435 A1* 8/2011 Pedersen ................. F03D 80/50
416/146 R
(Continued)

FOREIGN PATENT DOCUMENTS

CN 102187090 A 9/2011
CN 103384764 A 11/2013
(Continued)

OTHER PUBLICATIONS

Extended European Search Report for European Application No. 16177271.0, dated Jan. 3, 2017.
(Continued)

*Primary Examiner* — Christopher Verdier
(74) *Attorney, Agent, or Firm* — Schmeiser, Olsen & Watts LLP

(57) ABSTRACT

A method of handling the pitch bearing unit of a rotor blade mounted to the hub of a wind turbine, the method including the steps of providing an extension assembly at the interface between the rotor blade and the hub, moving the rotor blade outward from the hub by means of the extension assembly to open a gap large enough to accommodate the pitch bearing unit while maintaining a connection between the rotor blade and the hub, and removing the pitch bearing unit through the gap.

15 Claims, 9 Drawing Sheets

(51) Int. Cl.
*F03D 80/50* (2016.01)
*F03D 1/06* (2006.01)
*F03D 7/02* (2006.01)

(52) U.S. Cl.
CPC ......... *F05B 2230/80* (2013.01); *Y02E 10/721* (2013.01); *Y02P 70/523* (2015.11)

(56) References Cited

U.S. PATENT DOCUMENTS

| | | | |
|---|---|---|---|
| 2014/0010661 A1* | 1/2014 | Hancock | F03D 1/0658 416/207 |
| 2014/0109407 A1* | 4/2014 | Neumann | F03D 80/50 29/889.1 |
| 2014/0178197 A1* | 6/2014 | Risager | F03D 7/0224 416/1 |
| 2015/0288232 A1* | 10/2015 | Lemma | H02K 7/1838 290/55 |
| 2016/0010622 A1* | 1/2016 | Modrego Jimenez | F03D 13/20 29/889.1 |

FOREIGN PATENT DOCUMENTS

| | | |
|---|---|---|
| CN | 103443450 A | 12/2013 |
| CN | 105253795 A | 1/2016 |
| EP | 2661550 A1 | 11/2013 |
| EP | 2725220 A2 | 4/2014 |
| EP | 2806155 A1 | 11/2014 |
| WO | 2012093245 A1 | 7/2012 |
| WO | 2014206482 A1 | 12/2014 |

OTHER PUBLICATIONS

Non-English Chinese Office Action for related application No. 201710523388.7 dated Nov. 1, 2018.
Extended European Search Report for related European Application No. 161772710, dated Jan. 3, 2017. 6 pages.

\* cited by examiner

METHOD OF HANDLING A WIND TURBINE ROTOR BLADE PITCH BEARING UNIT

CROSS-REFERENCE TO RELATED APPLICATIONS

This application claims priority to European application No. EP16177271.0 having a filing date of Jun. 30, 2016, the entire contents of which are hereby incorporated by reference.

FIELD OF TECHNOLOGY

The following describes a method of handling a pitch bearing unit of a wind turbine rotor blade, a pitch bearing unit handling arrangement; and a wind turbine.

BACKGROUND

Wind turbines with several megawatts power output are generally very tall structures, since long rotor blades are required in order to achieve such power output levels. In order to extract the maximum amount of energy from the wind, the rotor blades of a wind turbine can be controlled by a pitch system so that each blade can be optimally pitched into the wind. To this end, the root end of a rotor blade is usually circular, so that it can be mounted to a circular pitch bearing. There are various ways of realizing a pitch bearing for a rotor blade. For example, a toothed ring may be mounted at the inside or outside of the rotor blade at the inner root end. The pinion gear of a pitch drive motor can engage with the toothed wheel, so that the drive motor can be actuated to turn the blade in the desired direction and by the desired amount. Alternatively, the pitch bearing can be realised as a roller bearing, a planetary bearing, etc.

The pitch bearing can be supplied as a self-contained unit. For example, the pitch bearing can be supplied as an annular or disc-shaped component that is realised to be mounted between the hub and the blade. For example, such a bearing unit can be secured to the hub by one or more annular arrangements of bolts extending from the bearing unit into the body of the hub and extending into the blade root end. Suitable connections can be made to one or more pitch drive motors, which may be arranged in the hub, to actuate the pitch bearing to pitch the blade by the desired degree about its longitudinal axis.

Any kind of pitch bearing is subject to wear and tear, and may eventually require maintenance or replacement. However, it is not easy to access a pitch bearing when installed in a large wind turbine, especially in the case of an offshore wind turbine. In a conventional approach, a large crane is brought into position at the base of the wind turbine tower, and the hub is turned so that the rotor blade with the defective bearing points downwards. The blade is dismounted and lowered to ground by the crane. The pitch bearing unit is then dismounted and lowered to ground by the crane. The crane then lifts a replacement bearing unit to hub height, and the bearing unit is mounted to the hub. Finally, the crane lifts the rotor blade again, so that the blade can be mounted to the bearing unit.

A "large crane" is to be understood as a crane that can reach to hub height of a wind turbine. An example of such a crane might be the type of crane used to install a wind turbine. For an offshore wind turbine, a large installation vessel may be necessary to support such a crane during an installation or maintenance manoeuvre. Crane time is expensive for this type of crane, so that repair and maintenance procedures that require their use are generally very costly.

SUMMARY

An aspect relates to providing a more economical way of removing the pitch bearing unit of a wind turbine rotor blade in a maintenance procedure.

According to embodiments of the invention, the method of handling the pitch bearing unit of a rotor blade mounted to the hub of a wind turbine comprises the steps of providing an extension assembly at the interface between the rotor blade and the hub; moving the rotor blade outward from the hub by means of the extension assembly to open a gap large enough to facilitate removal of a pitch bearing unit while maintaining a connection between the rotor blade and the hub; and removing the pitch bearing unit through the gap. The steps of the inventive method may be carried out in reverse, since the gap is large enough to facilitate insertion of a pitch bearing unit.

An advantage of the bearing unit handling method according to embodiments of the invention is that there is no need to use a large crane of the type described above. A defective bearing unit can therefore be removed and replaced by a replacement bearing unit in a cost-effective manner. In the case of an offshore wind turbine, a significant reduction in costs can be achieved by not having to pay for an installation vessel or a vessel big enough to support a large crane.

According to embodiments of the invention, the wind turbine rotor blade pitch bearing unit handling arrangement comprises an extension assembly at the interface between a wind turbine hub and a rotor blade, adapted to move the rotor blade outward from the hub to open a gap large enough to accommodate the removal and/or insertion of a pitch bearing unit while maintaining a connection between the rotor blade and the hub.

An advantage of the bearing unit handling arrangement is that it can be realized with relatively low cost effort. The bearing unit handling arrangement allows replacement of a defective bearing unit without actually having to completely detach the rotor blade from the hub. During the entire handling manoeuvre, the blade remains connected to the hub, and a bearing unit is removed or inserted through the gap.

According to embodiments of the invention, the wind turbine comprises a number of rotor blades mounted to a hub, a pitch bearing unit for each rotor blade, and such a pitch bearing unit handling arrangement to facilitate the removal and/or insertion of a pitch bearing unit.

The wind turbine according to embodiments of the invention is equipped with a means to facilitate the performance of maintenance procedures on the bearing unit(s), avoiding the need for an installation crane or other large crane, so that the costs of such manoeuvres can be kept to a favourably low level.

Particularly advantageous embodiments and features of the invention are given by the dependent claims, as revealed in the following description. Features of different claim categories may be combined as appropriate to give further embodiments not described herein.

A wind turbine can have one or more rotor blades mounted to a hub to face into the wind, and most wind turbine usually have three rotor blades. In the following, without restricting embodiments of the invention in any way, it may be assumed that wind turbine has three rotor blades mounted to a hub, and that each rotor blade is equipped with a pitch bearing unit and a pitch drive module so that the pitch angle of the blade can be adjusted as required during operation of the wind turbine in order to extract the maximum amount of energy from the wind. As already indicated above, there are various kinds of pitch bearings. In the context of embodiments of the invention, the "pitch bearing unit" may be assumed to be an annular or disc-shaped component of the type described in the introduction, realised for mounting between the hub and blade. In the following, the pitch bearing unit may simply be referred to as the "bearing" or the "bearing unit", and may be assumed to be a self-contained component for mounting between the blade and hub.

The bearing handling method according to embodiments of the invention allow a pitch bearing unit to be removed from the hub with a favourably low level of effort, and for a replacement pitch bearing unit to be inserted into the hub as required. As indicated above, a large crane such as the type of crane used on an installation vessel or the type of crane used to install a wind turbine is not required, so that the cost of the manoeuvre can be kept favourably low. Since the bearing unit is essentially at hub height when installed, it may be necessary to lower a defective pitch bearing unit from hub height to ground level. To this end, the bearing unit handling arrangement preferably comprises a hoist assembly mounted to the wind turbine, for example at hub height, and realized to lower a removed pitch bearing unit from the hub to ground level. The hoist assembly can of course also be used to raise a replacement pitch bearing unit from ground level to hub height. The hoist assembly can be a relatively small unit which need only be dimensioned to bear the weight of the pitch bearing unit as this is lowered or raised between ground level and hub height. The hoist assembly can be temporarily mounted at the outside of the nacelle or the outside of the hub, whichever is appropriate. After completion of the manoeuvre, the hoist unit can then be dismantled and stowed for future use. For example the hoist unit may be stowed inside the nacelle, and may be used to assist during other maintenance procedures as these become necessary.

Embodiments of the invention are based on the insight that it is possible for the rotor blade to remain connected in some way to the hub while the bearing unit is being dismounted. Therefore, in a preferred embodiment of the invention, the step of providing the extension assembly comprises inserting a number of extension elements into the root end of the rotor blade, wherein an extension element is realized to facilitate a displacement of the rotor blade in a direction radially outward from the hub while maintaining the connection between the blade and hub. An extension element can be a rod or similar component, realised to extend into the body of the blade at the blade root end, preferably in a direction parallel to the blade longitudinal axis, and into the body of the hub. An extension element can also extend through the bearing unit as appropriate. If the extension element is realised as a threaded rod, with complementary threaded bushings in the blade root end and/or the bearing unit and/or the hub, the blade can be displaced radially outward in a favourably straightforward manner simply by turning the threaded rods. This step is preceded by a step of releasing the main mechanical connection between blade and bearing unit, for example by removing an annular arrangement of bolts that otherwise connect the rotor blade to the bearing unit. After releasing the blade from the bearing unit, the blade can be displaced outward from the hub along the extension rods. In other words, even when the bolts that otherwise connect the blade to the bearing unit have been removed, the blade is held in place relative to the hub by means of the extension elements. The extension elements can be inserted into the blade root end prior to beginning a bearing removal procedure. Equally, the extension elements may be permanently installed in the blade root end. Since the extension elements are only needed to hold the blade while in its downward pointing position, the number of extension elements can be significantly lower than the number connecting bolts required to mount a blade to the bearing unit. For example, for a rotor blade with a diameter of 3 m at its root end, eighty or more M36 connecting bolts may be required, whereas only eight extension rods may be sufficient to hold the blade during the initial stages of the bearing exchange manoeuvre.

A further aspect of the bearing unit handling arrangement according to embodiments of the invention is the provision of a number of holding blocks or fixation brackets that are initially mounted to the hub, and then also mounted to the rotor blade. A fixation bracket can be shaped at one end to match the outer shape of the hub, or an adapter may be placed between the hub and the fixation bracket. The step of mounting a fixation bracket can be performed with the rotor blade pointing upwards, so that a maintenance worker can mount the fixation brackets on the outside of the hub without undue risk. A fixation bracket is constructed to be connected to the hub, and also to the rotor blade, in such a way that the body of the fixation bracket maintains the gap defined by the extension elements between the hub and the blade. For example, an L-shaped fixation bracket can be mounted to the hub using a number of bolts at one end, and can be mounted to the blade root end using a number of bolts at the other end, as will become clear from the diagrams. Any number of fixation brackets may be deployed, depending on their structural form and load-bearing capacity. In a preferred embodiment of the invention, three fixation brackets are deployed, and are mounted to the hub so that an entire bearing unit can pass between them. To this end, the fixation brackets are preferably arranged within one half of the blade root end circumference. For example, with the blade axis of rotation as reference, neighbouring fixation brackets may be arranged to subtend an angle of at most 90°. Once the fixation brackets are in place, the extension elements can be removed, so that the rotor blade is no longer physically connected to the bearing unit and so that a space is created through which the bearing unit can pass.

Once the blade is securely held by the fixation brackets to maintain the gap created by the extension elements, the bearing unit can be released from the hub, and connected instead to a bearing unit displacement arrangement before being moved through the gap.

This can be achieved in a number of ways. In a preferred embodiment of the invention, the pitch bearing unit displacement assembly comprises a nacelle pivot mounted to the nacelle, and a pivot arm connected to the pivot and realized to extend into the gap. The pivot arm can be flat enough to be inserted into a space between the bearing unit and the hub, or into the gap between the rotor blade and the bearing unit. The bearing unit can be bolted or otherwise secured to the pivot arm. Once the bearing unit is secured to the pivot arm, the arm can be pivoted so that the bearing unit is removed from between the hub and blade. In one preferred embodiment of the invention, the pivot is mounted at a point underneath the nacelle, and a hoist unit is mounted at a point on top of the nacelle so that the bearing unit can be conveniently connected to the hoist unit, which can then lower the bearing unit to ground level. Here, the term "ground level" should not be construed in a limiting sense, and may also be understood to mean the deck of a vessel in the case of an offshore wind turbine, for example.

In a further preferred embodiment of the invention, the pitch bearing unit displacement assembly comprises a pivot arranged between the pitch bearing unit and the hub. Such a pivot is preferably arranged close to the outer edge of the bearing unit, so that a rotation of the bearing unit about its pivot has the effect of moving the bearing unit almost completely outside the space between hub and blade. Similarly to the approach described above, a hoist unit mounted to the nacelle or hub can then be used to lower the bearing unit to ground level.

In a further preferred embodiment of the invention, the pitch bearing unit displacement assembly comprises a number of rail assemblies arranged to slide the pitch bearing unit outward through the gap. A rail assembly may be understood to comprise an essentially horizontal rail extending outward from the hub, arranged to enclose or contain a complementary glider. The rail may be mounted to the bearing unit while the glider is mounted to the hub, or the other way around. One or more such rail elements may be used as required.

In addition to removing a bearing unit out through the gap, the embodiments described above can of course be used to introduce a replacement pitch bearing unit in through the gap, in which case the sequence of steps is reversed.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
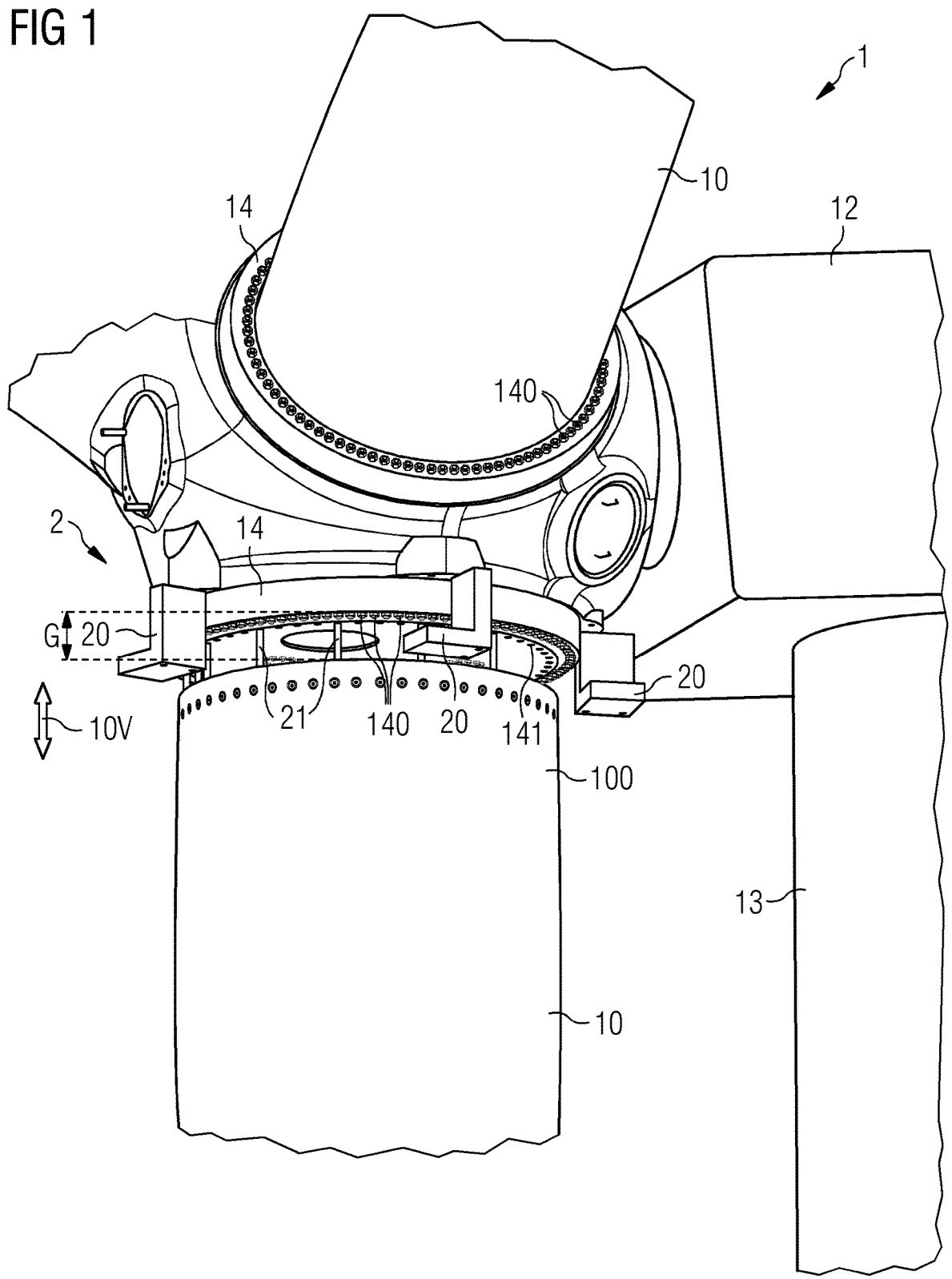
FIG. 1 shows a first stage of a pitch bearing exchange procedure using an embodiment of the bearing unit handling arrangement, in accordance with embodiments of the present invention.
Figure 2:
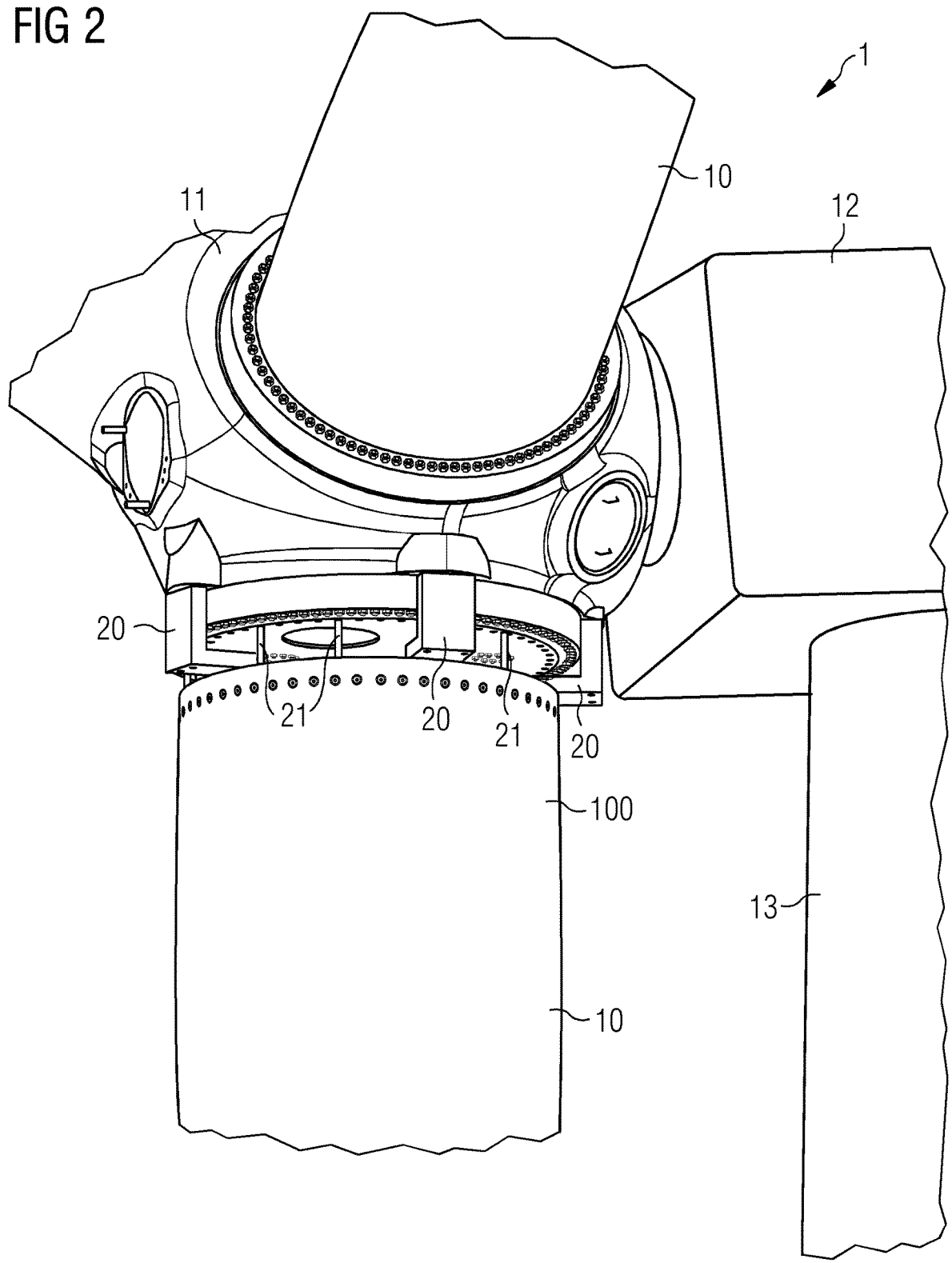
FIG. 2 shows a second stage of a pitch bearing exchange procedure using an embodiment of the bearing unit handling arrangement, in accordance with embodiments of the present invention.
Figure 3:
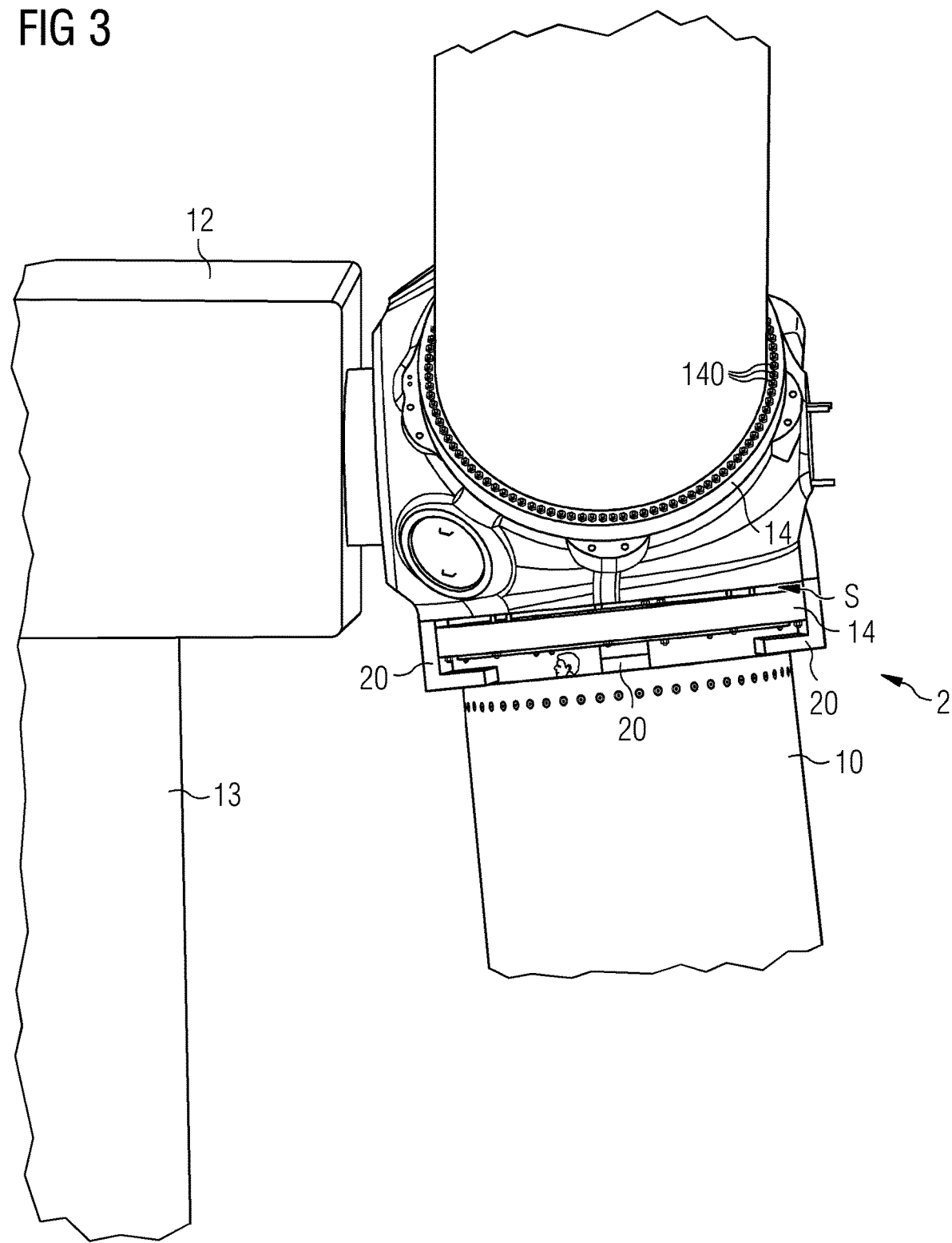
FIG. 3 shows a third stage of a pitch bearing exchange procedure using an embodiment of the bearing unit handling arrangement, in accordance with embodiments of the present invention.

FIGS. 1-3 show stages of a pitch bearing exchange procedure using an embodiment of the bearing unit handling arrangement 2 according to embodiments of the invention. A wind turbine 1 is shown, with three blades 10 mounted to a hub 11, which in turn is mounted via a rotor shaft to a generator installed inside a nacelle 12. The nacelle 12 is mounted atop a tower 13, which may have a height exceeding 80 m, especially in the case of an offshore wind turbine.

FIG. 1 shows a stage early on in the exchange procedure. A defective bearing unit is to be replaced. Several L-shaped fixation brackets 20 have been mounted to the hub 11 in a previous step during which the blade may have been pointing upwards to facilitate the mounting step. The rotor blade 10 is now pointing downwards, and extension rods 21 have been inserted between the bearing unit 14 and the blade root end 100. Prior to insertion and turning of the extension rods 21, there is no gap between pitch bearing 14 and rotor blade root end 100. However, once the extension rods 21 are in place, any bolts connecting the rotor blade 10 to the bearing unit 14 can be removed (corresponding bushings 141 are indicated in the diagram), and the extension rods 21 can be turned to gradually displace the rotor blade 10 radially outward from the hub 11 in the direction 10V shown, until a sufficiently large gap G is opened. The gap G is at least as wide as the height of the bearing unit 14.

FIG. 2 shows a next stage. Here, the fixation brackets 20 have been turned through 90° so that they can be bolted or otherwise secured to the blade root end 100, for example by tightening bolts in the bushings that are normally used to secure the blade root end 100 to the bearing unit 14.

FIG. 3 shows a next stage, observed from the other side of the nacelle. The diagram shows that the arrangement of three fixation brackets 20 inside one half of the circumference of the blade root end 100 will allow the bearing unit 14 to be removed. The diagram also shows a maintenance worker standing on a platform (not shown) inside the blade root end 100, where he can easily access the connecting bolts, extension rods 21, fixation brackets 20 etc. In this diagram, the bearing unit 14 is being disconnected from the hub 11, as indicated by the space S between hub 11 and bearing unit 14.

Figure 4:
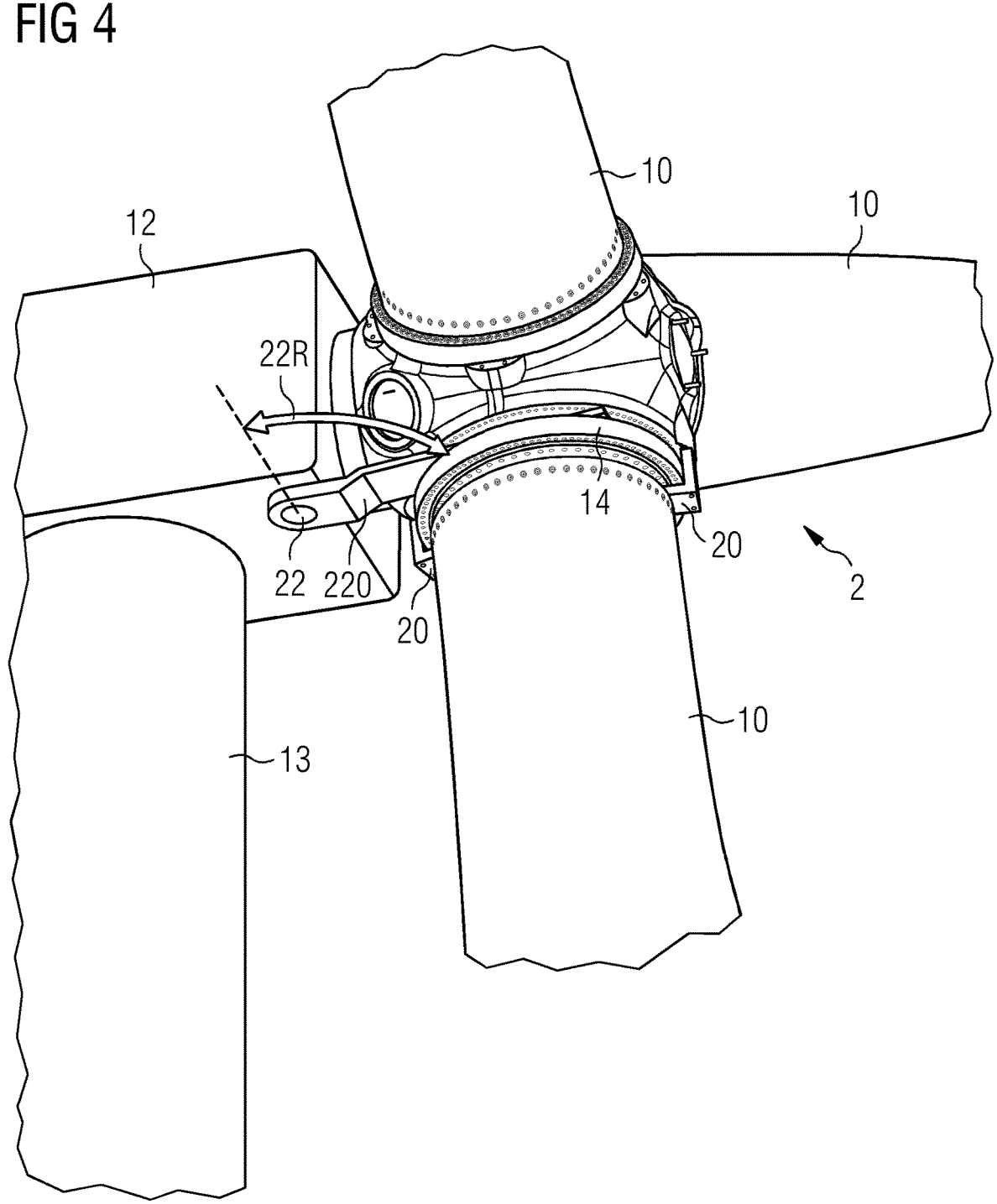
FIG. 4 shows a further stage during the pitch bearing exchange procedure of FIGS. 1-3, using a first embodiment of a bearing unit displacement assembly, in accordance with embodiments of the present invention.
Figure 5:
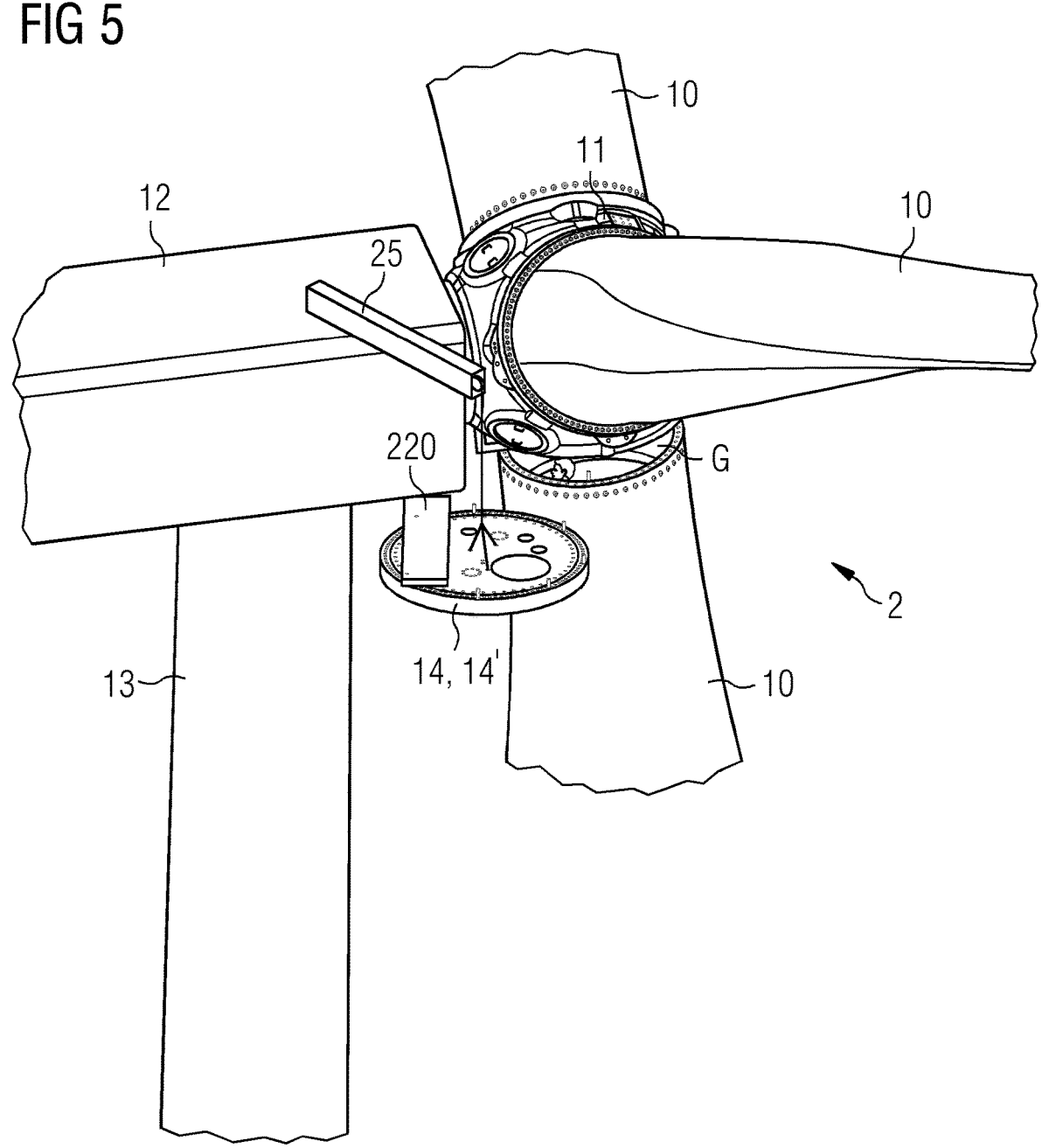
FIG. 5 shows a further stage during the pitch bearing exchange procedure of FIGS. 1-3, using a first embodiment of a bearing unit displacement assembly, in accordance with embodiments of the present invention.

FIGS. 4-5 show further stages during the pitch bearing exchange procedure of FIGS. 1-3, using a first embodiment of a bearing unit displacement assembly 22, 220. Here, a pivot 22 is permanently installed in the nacelle 12. For a bearing exchange procedure, a pivot arm 220 is mounted to the nacelle pivot 22. The pivot arm 220 can rotate about the nacelle pivot 22 in the direction 22R shown, and can enter the space S between bearing unit 14 and hub 11, so that a worker (inside the hub) can secure the bearing unit 14 to the pivot arm 22. Alternatively, the pivot arm 220 can enter the gap G between blade root end 100 and bearing unit 14, so that a worker inside the blade root end can secure the bearing unit 14 to the pivot arm 22.

Figure 6:
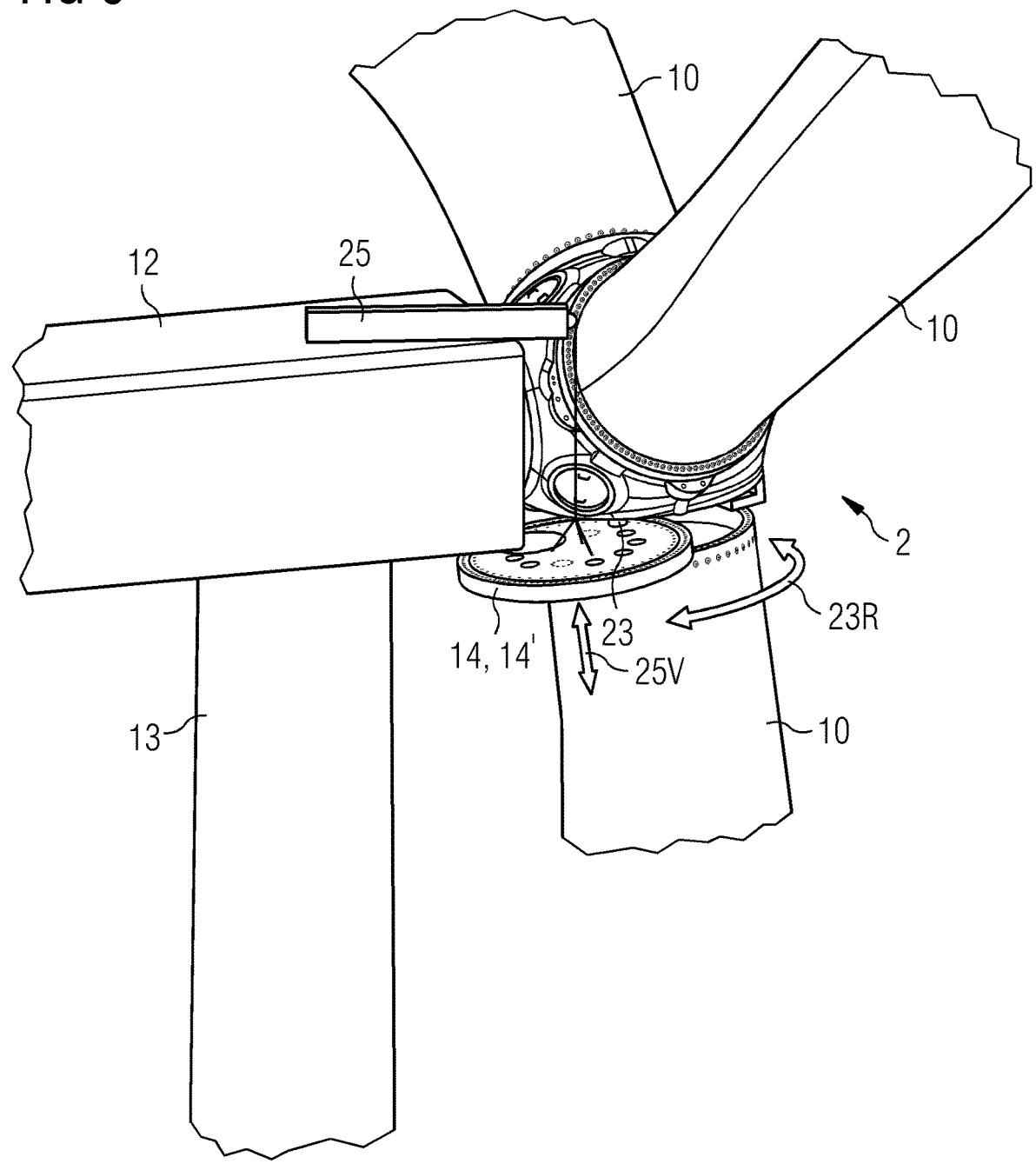
FIG. 6 shows a further stage during the pitch bearing exchange procedure of FIGS. 1-3, using a second embodiment of a bearing unit displacement assembly, in accordance with embodiments of the present invention.
Figure 7:
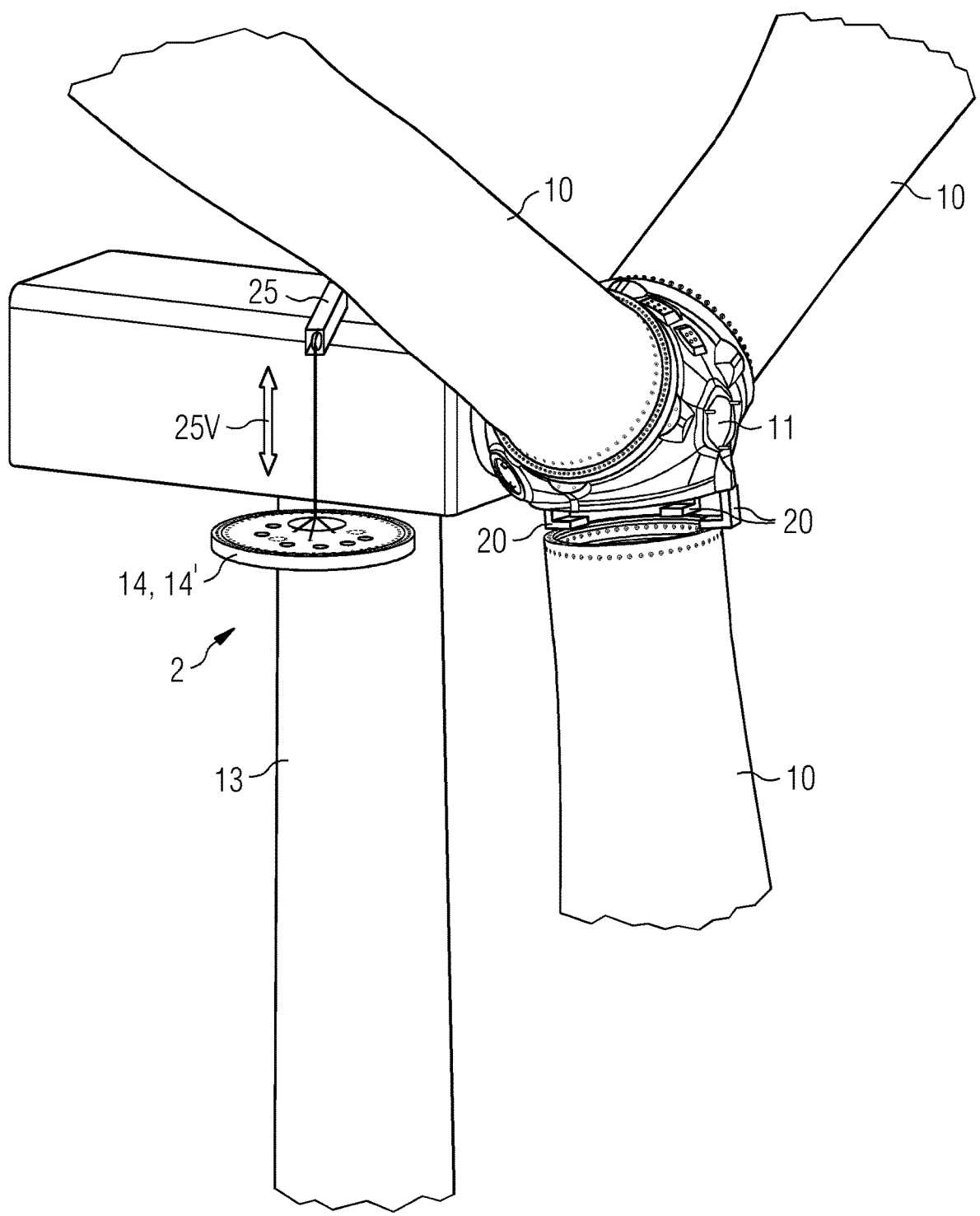
FIG. 7 shows a further stage during the pitch bearing exchange procedure of FIGS. 1-6, in accordance with embodiments of the present invention.

In FIG. 5, a hoist unit 25, for example a small crane 25, is shown in place on top of the nacelle 12. This hoist unit 25 can be stowed in the nacelle 12 when not in use. A cable or chain can be secured to the bearing unit 14, for example by a maintenance worker inside the hub or blade root end. The hoist unit 25 can then lower the defective bearing unit 14 to ground level, where it is detached. If the pivot arm 220 was mounted to the bearing unit 14 from below, the entire pivot arm 220 may be detached from the nacelle pivot 22 and lowered to ground level along with the bearing unit 14. A replacement bearing unit 14' can then be attached to the hoist unit 25 (and pivot arm 220, as the case my be) and raised to hub height, where the steps described above are performed in the reverse order to install the replacement bearing unit 14' between hub 11 and rotor blade 10. After completion of the exchange manoeuvre, any temporary apparatus such as the extension rods, fixation brackets, pivot arm, hoist unit etc. may be stowed in the nacelle 12 for later use, or removed and used in a bearing exchange procedure carried out on another wind turbine. FIG. 6 shows a further stage during the pitch bearing exchange procedure of FIGS. 1-3, using a second embodiment of a bearing unit displacement assembly. Here, a pivot 23 is installed between the bearing unit 14 and the hub 11 so that the bearing unit 14 can be rotated out of the gap G towards the hoist unit 25, in a direction shown by arrow 23R. The remainder of the procedure can be carried out as described above and as shown in FIG. 7, which shows a bearing unit 14, 14' being lowered to ground level or raised to hub height by the hoist unit 25 in a direction shown by arrow 25V in FIG. 6. This diagram also clearly shows the opening formed by the three fixation brackets 20 to allow an entire defective bearing unit 14 to be removed, and an entire replacement bearing unit 14' to be inserted while keeping the blade 10 attached to the hub 11.

Figure 8:
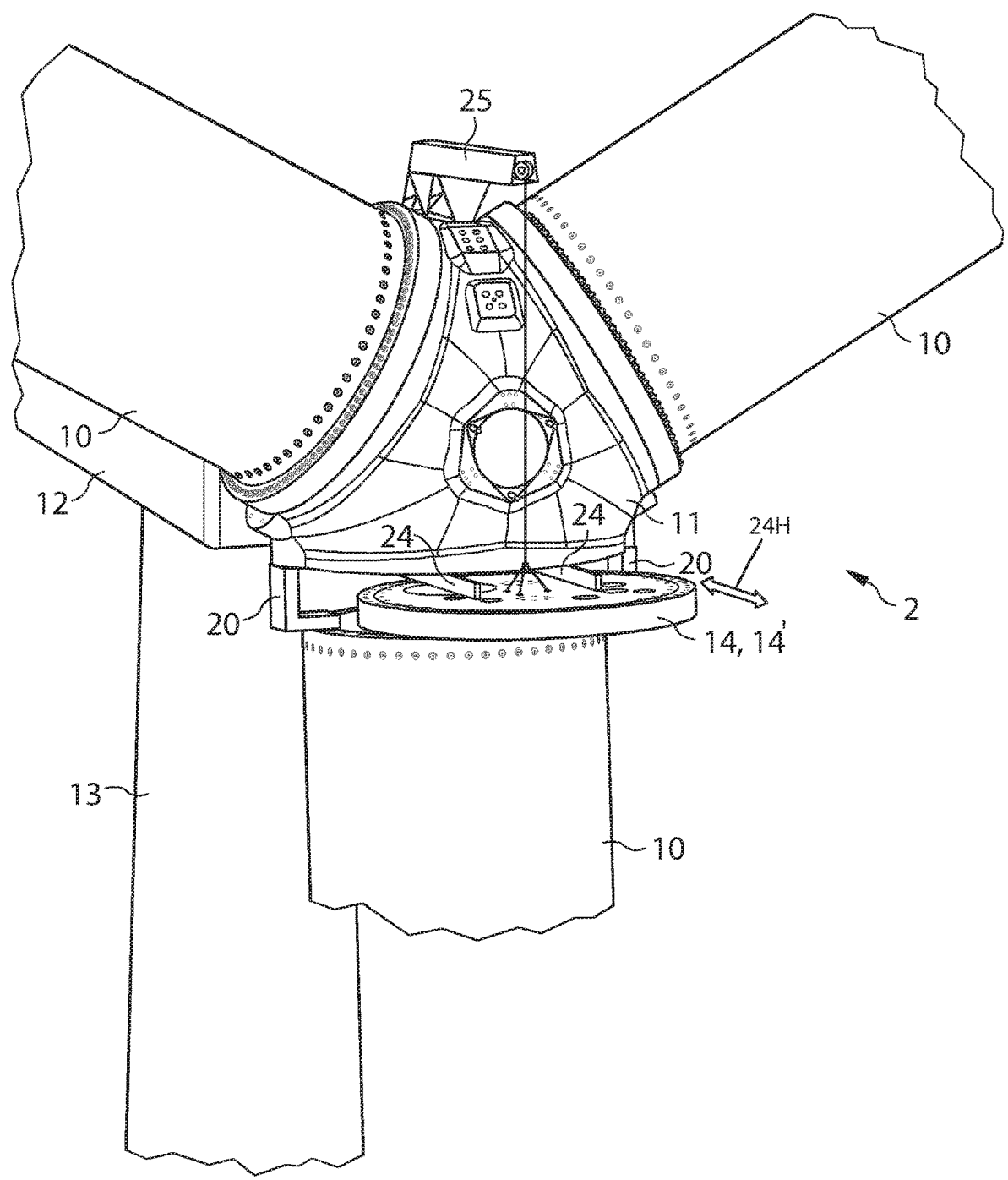
FIG. 8 shows a further stage during the pitch bearing exchange procedure of FIGS. 1-3, using a third embodiment of a bearing unit displacement assembly, in accordance with embodiments of the present invention.

FIG. 8 shows a further stage during the pitch bearing exchange procedure of FIGS. 1-3, using a third embodiment of a bearing unit displacement assembly. Here, rail assemblies 24 are mounted between the bearing unit 14 and the hub 11, so that the bearing unit 14 can slide outwards, essentially horizontally in the direction 24H shown (a slight upwards tilt of the generator rotational axis may be assumed to exist to avoid tower/blade collisions). In this embodiment, a hoist unit 25 is temporarily mounted on top of the hub 11, so that it can be connected by cable or wire to the bearing unit 14 in order to lower the bearing unit 14 to ground level.

Figure 9:
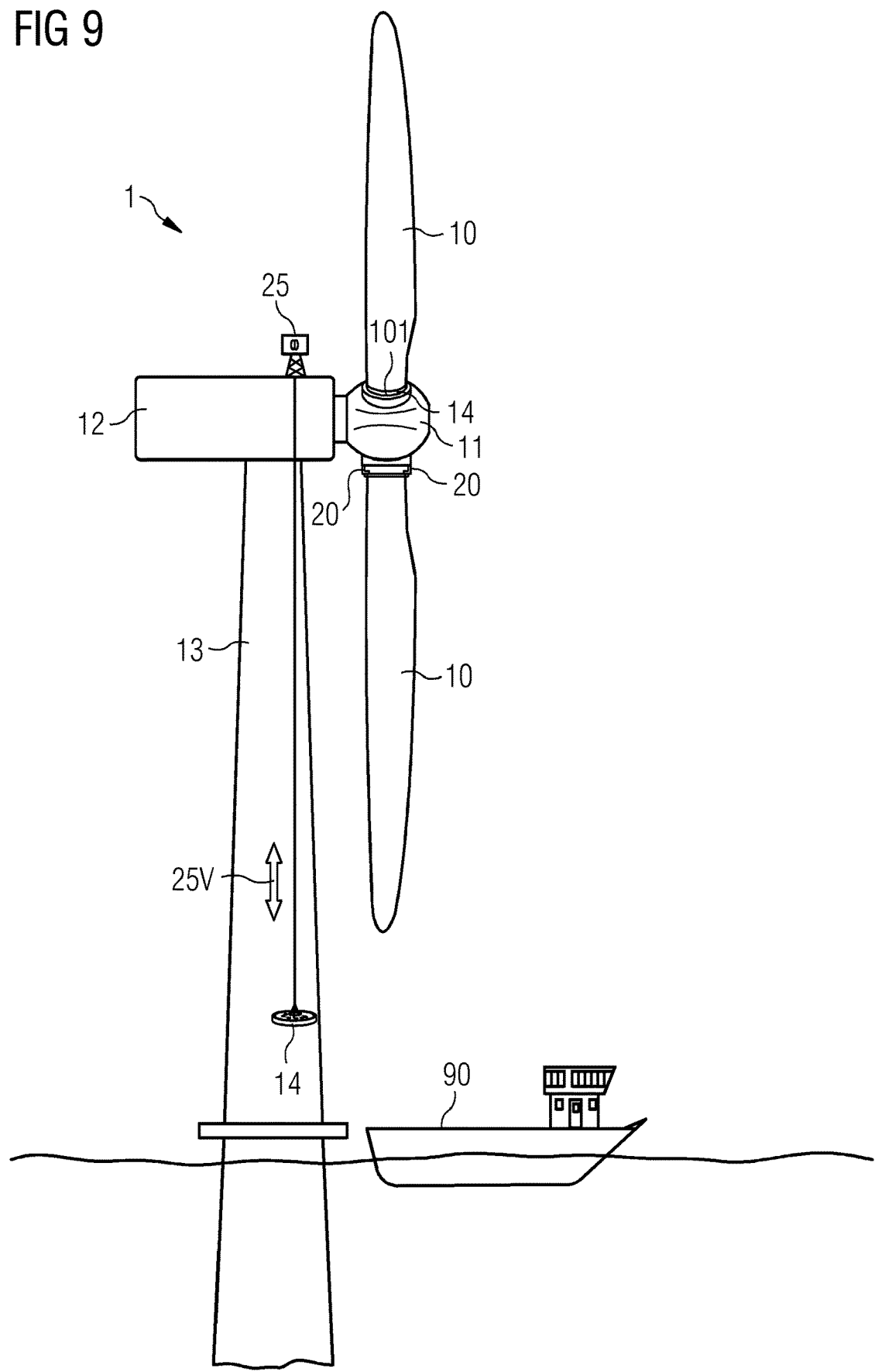
FIG. 9 shows the lowering of a bearing unit to ground level during a pitch bearing exchange procedure, in accordance with embodiments of the present invention.

FIG. 9 shows the lowering of a bearing unit 14 to "ground level" during a pitch bearing exchange procedure, in this case to a marine vessel 90 near the tower of an offshore wind turbine. A defective bearing 14 at the interface 101 between blade 10 and hub 11 can be replaced with a minimum of cost and effort since a crane, large enough to reach to hub height, is not needed. The procedure can be carried out for one or more of the bearing units 14.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of handling a pitch bearing unit of a rotor blade mounted to a hub of a wind turbine, comprising:
   providing an extension assembly at an interface between the rotor blade and the hub, the providing the extension assembly comprising inserting a plurality of extension elements into a root end of the rotor blade and turning the extension elements to facilitate a displacement of the rotor blade radially outward from the hub;
   moving the rotor blade outward from the hub by means of the extension assembly to open a gap large enough to accommodate the pitch bearing unit while maintaining a connection between the rotor blade and the hub; and
   removing the pitch bearing unit through the gap.

2. The method according to claim 1, further comprising dismounting the rotor blade from the hub and displacing the rotor blade outward from the hub along the plurality of extension elements.

3. The method according to claim 1, wherein the step of providing the extension assembly comprises mounting a plurality of fixation brackets to the hub, wherein a fixation bracket is configured to secure the rotor blade to the hub across the gap.

4. The method according to claim 3, further comprising removing the plurality of extension elements after securing the plurality of fixation brackets to the rotor blade.

5. The method according to claim 1, further comprising securing the pitch bearing unit to a bearing unit displacement assembly, disconnecting the pitch bearing unit from the hub, and moving the pitch bearing unit through the gap.

6. The method according to claim 1, further comprising inserting a replacement pitch bearing unit through the gap and moving the rotor blade inward towards the hub along the extension arrangement to close the gap.

7. The method according to claim 6, further comprising mounting a hoist unit to at least one of: a nacelle and the and/or hub prior to the handling of the pitch bearing unit, and dismounting the hoist unit after completion of the handling of the pitch bearing unit.

8. The method according to claim 6, further comprising mounting a temporary pitch bearing unit displacement assembly to at least one of: a nacelle and the hub prior to the handling of the pitch bearing unit and dismounting the temporary pitch bearing unit displacement assembly after completion of the handling of the pitch bearing unit.

9. A pitch bearing unit handling arrangement, comprising an extension assembly at an interface between a wind turbine hub and a rotor blade, the extension assembly comprising a plurality of extension elements configured to be inserted into a root end of the rotor blade and turned to facilitate a displacement of the rotor blade radially outward from the hub to open a gap large enough to accommodate a handling of a pitch bearing unit while maintaining a connection between the rotor blade and the hub.

10. The pitch bearing unit handling arrangement according to claim 9, comprising a pitch bearing unit displacement assembly configured to move the pitch bearing unit through the gap.

11. The pitch bearing unit handling arrangement according to claim 10, wherein the pitch bearing unit displacement assembly comprises a pivot mounted to a nacelle, and a pivot arm connected to the pivot and configured to be displaced into the gap.

12. The pitch bearing unit handling arrangement according to claim 10, wherein the pitch bearing unit displacement assembly comprises a pivot arranged between the pitch bearing unit and the hub.

13. The pitch bearing unit handling arrangement according to claim 10, wherein the pitch bearing unit displacement assembly comprises a plurality of rail assemblies arranged to slide the pitch bearing unit outward through the gap in an essentially horizontal direction.

14. The pitch bearing unit handling arrangement according to claim 9, comprising a hoist assembly mounted to a wind turbine and configured to lower a removed pitch bearing unit from the hub to ground level.

15. A wind turbine comprising:
a plurality of rotor blades mounted to the hub,
the pitch bearing unit, and
the pitch bearing unit handling arrangement according to claim 9.

* * * * *